United States Patent
Matsubara et al.

(10) Patent No.: US 8,988,774 B2
(45) Date of Patent: Mar. 24, 2015

(54) PROJECTOR AND PROJECTION SCREEN

(71) Applicant: Funai Electric Co., Ltd., Osaka (JP)

(72) Inventors: Hiroki Matsubara, Osaka (JP); Kenji Nagashima, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 0 days.

(21) Appl. No.: 14/075,439

(22) Filed: Nov. 8, 2013

(65) Prior Publication Data

US 2014/0133018 A1   May 15, 2014

(30) Foreign Application Priority Data

Nov. 9, 2012 (JP) .................................. 2012-247435

(51) Int. Cl.
| | |
|---|---|
| *G03B 21/60* | (2014.01) |
| *G03B 21/625* | (2014.01) |
| *G03B 21/20* | (2006.01) |
| *G03B 21/62* | (2014.01) |
| *H04N 9/31* | (2006.01) |

(52) U.S. Cl.
CPC .......... *G03B 21/625* (2013.01); *G03B 21/2033* (2013.01); *G03B 21/62* (2013.01); *H04N 9/3129* (2013.01)
USPC ............................. 359/453; 359/456; 359/460

(58) Field of Classification Search
USPC .......................................... 359/453, 456, 460
See application file for complete search history.

(56) References Cited

U.S. PATENT DOCUMENTS

| | | | |
|---|---|---|---|
| 6,185,038 B1 * | 2/2001 | Yamaguchi et al. .......... | 359/457 |
| 7,199,933 B2 | 4/2007 | Yavid et al. | |
| 7,408,707 B2 * | 8/2008 | Yeo et al. ...................... | 359/452 |
| 7,443,582 B2 * | 10/2008 | Yamauchi ..................... | 359/449 |
| 2002/0109916 A1 * | 8/2002 | Moshrefzadeh .............. | 359/456 |
| 2003/0072080 A1 * | 4/2003 | Ariyoshi et al. .............. | 359/487 |
| 2007/0201131 A1 * | 8/2007 | Katsura ......................... | 359/460 |

FOREIGN PATENT DOCUMENTS

| | | |
|---|---|---|
| EP | 0862081 A1 | 9/1998 |
| EP | 1491918 A2 | 12/2004 |
| JP | 05-173094 A | 7/1993 |
| JP | 2004046256 A | 2/2004 |
| JP | 2005-338293 A | 12/2005 |
| JP | 2011-191780 A | 9/2011 |
| JP | 4827202 B2 | 9/2013 |
| WO | 2006020583 A2 | 2/2006 |

* cited by examiner

*Primary Examiner* — Christ Mahoney
(74) *Attorney, Agent, or Firm* — Baker & Hostetler LLP

(57) ABSTRACT

This projector includes a laser light generation portion, a projection portion scanning laser light, and a projection screen. The projection screen includes a lens member including a plurality of lens portions splitting the laser light and a diffusion member arranged to be opposed to the lens member, having an incident surface and a diffusion portion. The diffusion portion of the diffusion member is arranged at a position apart by a distance larger than the focal length of the lens member along an optical axis with respect to the optical principal surface of the lens member.

19 Claims, 9 Drawing Sheets

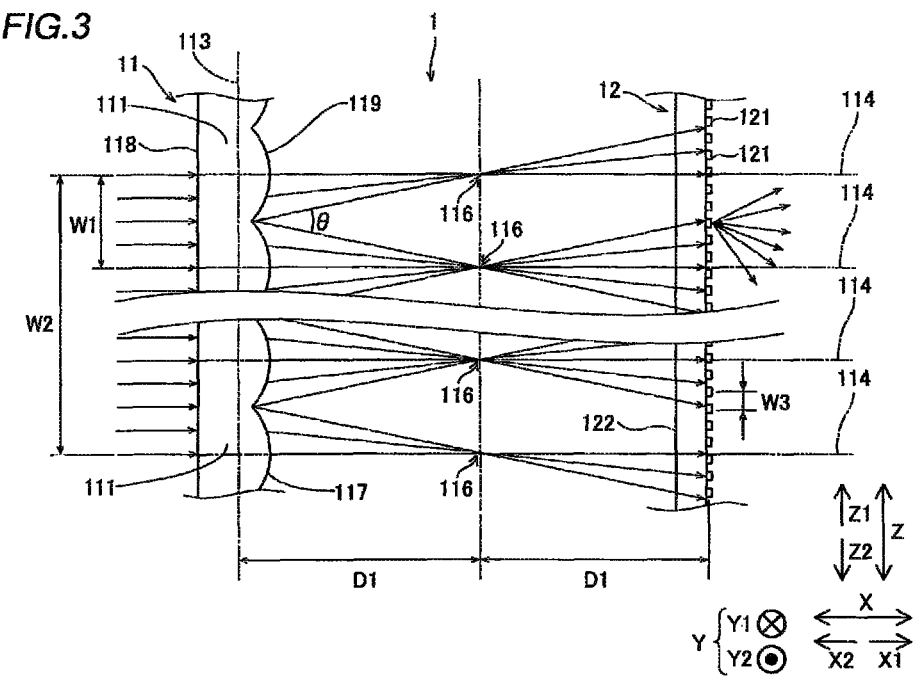
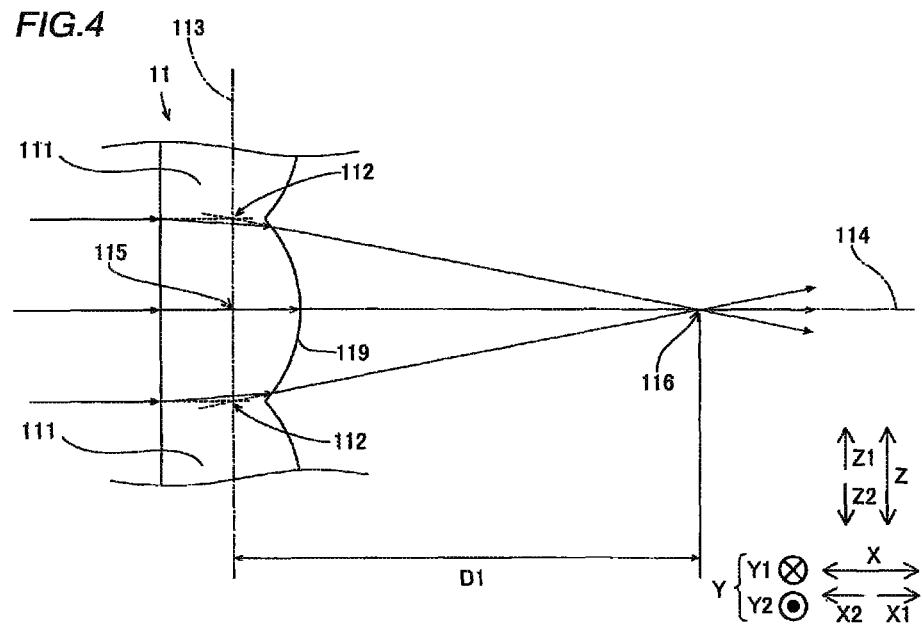

PROJECTOR AND PROJECTION SCREEN

CROSS-REFERENCE TO RELATED APPLICATIONS

The present application claims the benefit of Japanese Application Serial No. 2012-247435, with a filing date of Nov. 9, 2012.

BACKGROUND OF THE INVENTION

1. Field of the Invention

The present invention relates to a projector and a projection screen, and more particularly, it relates to a projector and a projection screen each including a lens member splitting laser light and a diffusion member diffusing the laser light.

2. Description of the Background Art

A projector and a projection screen each including a lens member splitting laser light and a diffusion member diffusing the laser light are known in general, as disclosed in Japanese Patent Laying-Open No. 5-173094 (1993).

Japanese Patent Laying-Open No. 5-173094 discloses a laser display device (projector) including a laser light source (laser light generation portion) emitting laser light on the basis of an input image signal, a galvanometer mirror (projection portion) projecting an image by scanning the laser light emitted from the laser light source, and a rear projection type screen portion (projection screen) on which the image is projected. The rear projection type screen portion of this laser display device includes a lenticular lens (lens member) including a plurality of lens portions splitting the laser light scanned by the galvanometer mirror and a volume diffuser (diffusion member) arranged to be opposed to the lenticular lens, having an incident surface on which the laser light split by the lenticular lens is incident and crystalline powder (diffusion portion) diffusing the laser light incident from the incident surface. The incident surface of this volume diffuser is provided at the focal position of the lenticular lens along an optical axis with respect to the optical principal surface of the lenticular lens. Although not clearly described in the aforementioned Japanese Patent Laying-Open No. 5-173094, the crystalline powder of the volume diffuser is conceivably provided over the entire region of the volume diffuser from illustration in FIG. 3, and the laser light is diffused by the crystalline powder at the focal position.

In the laser display device according to the aforementioned Japanese Patent Laying-Open No. 5-173094, however, the laser light is sufficiently narrowed down at the focal position, so that the pitch of the crystalline powder conceivably becomes relatively large with respect to the spot diameter of the laser light at the focal position. In this case, the laser light is hardly diffused by the crystalline powder, so that diffusion components are reduced. Thus, the pattern of speckle noise is hardly averaged by synthesizing the diffusion components. Therefore, the effect of reducing speckle noise conceivably becomes insufficient.

SUMMARY OF THE INVENTION

The present invention has been proposed in order to solve the aforementioned problem, and an object of the present invention is to provide a projector and a projection screen capable of obtaining the effect of sufficiently reducing speckle noise by sufficiently diffusing laser light.

A projector according to a first aspect of the present invention includes a laser light generation portion emitting laser light on the basis of an input image signal, a projection portion projecting an image by scanning the laser light emitted from the laser light generation portion, and a projection screen on which the image is projected, while the projection screen includes a lens member including a plurality of lens portions splitting the laser light scanned by the projection portion and a diffusion member arranged to be opposed to the lens member, having an incident surface on which the laser light split by the lens member is incident and a diffusion portion diffusing the laser light incident from the incident surface, and the diffusion portion of the diffusion member is arranged at a position apart by a distance larger than the focal length of the lens member along an optical axis with respect to the optical principal surface of the lens member.

In the projector according to a first aspect of the present invention, as hereinabove described, the diffusion portion of the diffusion member is arranged at the position apart by the distance larger than the focal length of the lens member along the optical axis with respect to the optical principal surface of the lens member, whereby the laser light whose diameter is increased after passing through the focal position can be diffused by the diffusion portion, and hence a relative increase in the pitch of the diffusion portion with respect to the spot diameter of the laser light at the diffusion portion can be suppressed. Thus, the laser light can be sufficiently diffused by the diffusion portion, and hence the effect of sufficiently reducing speckle noise can be obtained by synthesizing the diffusion components.

In the aforementioned projector according to the first aspect, the diffusion portion of the diffusion member is preferably arranged at a position apart by a distance larger than the focal length of the lens member along the optical axis with respect to the optical principal surface of the lens member and apart by a distance not larger than about twice the focal length of the lens member. According to this structure, unlike the case where the diffusion portion is arranged at a position apart by a distance larger than about twice the focal length of the lens member, the laser light whose diameter is increased to some extent after passing through the focal position can be diffused by the diffusion portion while the split laser light is prevented from overlapping adjacent laser light by increasing the diameter after passing through the focal position. Consequently, the effect of sufficiently reducing speckle noise can be obtained while a reduction in the resolution of the image projected on the projection screen resulting from overlapping of the laser light is suppressed.

In the aforementioned projector according to the first aspect, the optical principal surface is preferably the locus of the intersection of the extended line of incident light incident on the lens member and the extended line of outgoing light outgoing from the lens member.

In the aforementioned projector according to the first aspect, a lens pitch between the lens portions of the lens member is preferably smaller than the diameter of the laser light emitted from the laser light generation portion. According to this structure, the laser light scanned by the projection portion can be easily split into small pieces, and the split laser light can be projected. Consequently, a reduction in the resolution of the image projected on the projection screen resulting from generation of a region on which no laser light is projected between a region on which the laser light split by a part of a lens portion is projected and a region on which the laser light split by an adjacent lens portion is projected can be suppressed when the laser light scanned by the projection portion is incident on the part of the lens portion.

In this case, the lens pitch between the lens portions of the lens member is preferably not more than about one third the diameter of the laser light emitted from the laser light generation portion. According to this structure, the laser light scanned by the projection portion can be easily split into small (three or more) pieces, and the split laser light can be projected. Consequently, a reduction in the resolution of the image projected on the projection screen resulting from generation of the region on which no laser light is projected between the region on which the laser light split by the part of the lens portion is projected and the region on which the laser light split by the adjacent lens portion is projected can be further suppressed when the laser light scanned by the projection portion is incident on the part of the lens portion.

In the aforementioned projector according to the first aspect, the lens member is preferably configured such that a first surface thereof includes a projecting convex lens and a second surface thereof has a flat surface that is substantially flattened, the diffusion member is preferably configured such that the incident surface thereof is substantially flattened, and the projection screen is preferably configured such that the flat surface of the lens member is substantially parallel to the incident surface of the diffusion member. According to this structure, the laser light whose diameter is uniformly increased (diameter is uniform in size) after passing through the focal position can be emitted and diffused to the entire diffusion portion, and hence a relative increase in the pitch of the diffusion portion with respect to the spot diameter of the laser light at the diffusion portion can be further suppressed.

In the aforementioned projector according to the first aspect, the lens member is preferably configured such that the lens portions having at least two different focal lengths are arranged. According to this structure, the laser light can be easily split at different angles by the lens portions having the different focal lengths, and hence speckle noise can be easily effectively reduced by synthesizing the diffusion components.

In the aforementioned projector according to the first aspect, the lens member is preferably configured such that the lens portions are arranged at at least two different lens pitches. According to this structure, the laser light can be easily split at different angles by the lens portions arranged at the different lens pitches, and hence speckle noise can be easily more effectively reduced by synthesizing the diffusion components.

In the aforementioned projector according to the first aspect, the lens member preferably includes a microlens array including the plurality of lens portions. According to this structure, the laser light scanned by the projection portion can be easily split by the microlens array.

In the aforementioned projector according to the first aspect, the diffusion member preferably includes a directional diffusion sheet having directivity of diffusing the laser light in a prescribed direction. According to this structure, unlike the case where the laser light is diffused in all directions, the laser light can be diffused to the display side, and hence a reduction in the luminance of an image resulting from excessive diffusion can be suppressed.

In this case, the directional diffusion sheet preferably has directivity of diffusing the laser light toward an emitting surface opposite to the incident surface and not diffusing outside light incident from the emitting surface side toward the emitting surface. According to this structure, the laser light can be diffused toward the emitting surface, and hence a reduction in the luminance of an image resulting from excessive diffusion can be suppressed. Furthermore, the outside light is not diffused toward the emitting surface, and hence difficulty in viewing an image due to the outside light can be suppressed.

In the aforementioned projector according to the first aspect, the lens member is preferably configured such that a first surface thereof projects in the form of a convex lens and a second surface thereof has a flat surface that is substantially flattened, the diffusion member is preferably configured such that the incident surface is substantially flattened and the diffusion portion is formed in the vicinity of an emitting surface opposite to the incident surface, and the projection screen is preferably configured such that the flat surface of the lens member and the incident surface of the diffusion member are bonded to each other. According to this structure, the position of the diffusion member with respect to the lens member can be stably fixed, and hence the diffusion portion can be stably arranged at a position apart by a prescribed distance larger than the focal length of the lens member along the optical axis with respect to the optical principal surface of the lens member.

In the aforementioned projector according to the first aspect, a plurality of diffusion portions are preferably provided, and a pitch between the plurality of diffusion portions is preferably smaller than the lens pitch of the lens member. According to this structure, a coarse image projected on the projection screen due to the lens pitch of the lens member can be suppressed.

In the aforementioned structure in which the diffusion portion of the diffusion member is arranged at the position apart by the distance larger than the focal length of the lens member along the optical axis with respect to the optical principal surface of the lens member and apart by the distance not larger than about twice the focal length of the lens member, the diffusion portion of the diffusion member is preferably arranged at a position apart by a distance larger than the focal length of the lens member along the optical axis with respect to the optical principal surface of the lens member and apart by a distance about twice the focal length of the lens member. According to this structure, the diffusion portion of the diffusion member is arranged at a more appropriate position with respect to the lens member, whereby the laser light whose diameter is increased to a diameter substantially equal to the diameter of the pre-split laser light can be diffused by the diffusion portion while the split laser light is prevented from overlapping adjacent laser light by increasing the diameter after passing through the focal position, unlike the case where the diffusion portion of the diffusion member is arranged at the position apart by the distance larger than about twice the focal length of the lens member. Consequently, the effect of sufficiently reducing speckle noise can be obtained while a reduction in the resolution of the image projected on the projection screen resulting from overlapping of the laser light is suppressed.

In the aforementioned projector according to the first aspect, the diffusion portion is preferably provided on a side closer to an emitting surface opposite to the incident surface with respect to the center of the diffusion member in a thickness direction. According to this structure, the laser light diffused by the diffusion portion can be suppressed from being refracted by the diffusion member when travelling inside the diffusion member, and hence a reduction in the resolution of an image can be suppressed.

A projection screen according to a second aspect of the present invention includes a lens member including a plurality of lens portions splitting emitted laser light and a diffusion member arranged to be opposed to the lens member, having an incident surface on which the laser light split by the lens member is incident and a diffusion portion diffusing the laser light incident from the incident surface, while the diffusion portion of the diffusion member is arranged at a position apart by a distance larger than the focal length of the lens member along an optical axis with respect to the optical principal surface of the lens member.

In the projection screen according to the second aspect of the present invention, as hereinabove described, the diffusion portion of the diffusion member is arranged at the position apart by the distance larger than the focal length of the lens member along the optical axis with respect to the optical principal surface of the lens member, whereby the laser light whose diameter is increased after passing through the focal position can be diffused by the diffusion portion, and hence a relative increase in the pitch of the diffusion portion with respect to the spot diameter of the laser light at the diffusion portion can be suppressed. Thus, the laser light can be sufficiently diffused by the diffusion portion, and hence the effect of sufficiently reducing speckle noise can be obtained by synthesizing the diffusion components.

In the aforementioned projection screen according to the second aspect, the diffusion portion of the diffusion member is preferably arranged at a position apart by a distance larger than the focal length of the lens member along the optical axis with respect to the optical principal surface of the lens member and apart by a distance not larger than about twice the focal length of the lens member. According to this structure, unlike the case where the diffusion portion is arranged at a position apart by a distance larger than about twice the focal length of the lens member, the laser light whose diameter is increased to some extent after passing through the focal position can be diffused by the diffusion portion while the split laser light is prevented from overlapping adjacent laser light by increasing the diameter after passing through the focal position. Consequently, the effect of sufficiently reducing speckle noise can be obtained while a reduction in the resolution of an image projected on the projection screen resulting from overlapping of the laser light is suppressed.

In the aforementioned projection screen according to the second aspect, the optical principal surface is preferably the locus of the intersection of the extended line of incident light incident on the lens member and the extended line of outgoing light outgoing from the lens member.

In the aforementioned projection screen according to the second aspect, a lens pitch between the lens portions of the lens member is preferably smaller than the diameter of the emitted laser light. According to this structure, the laser light scanned by a projection portion can be easily split into small pieces, and the split laser light can be projected. Consequently, a reduction in the resolution of the image projected on the projection screen resulting from generation of a region on which no laser light is projected between a region on which the laser light split by a part of a lens portion is projected and a region on which the laser light split by an adjacent lens portion is projected can be suppressed when the laser light scanned by the projection portion is incident on the part of the lens portion.

In this case, the lens pitch between the lens portions of the lens member is preferably not more than about one third the diameter of the emitted laser light. According to this structure, the laser light scanned by the projection portion can be easily split into small (three or more) pieces, and the split laser light can be projected. Consequently, a reduction in the resolution of the image projected on the projection screen resulting from generation of the region on which no laser light is projected between the region on which the laser light split by the part of the lens portion is projected and the region on which the laser light split by the adjacent lens portion is projected can be further suppressed when the laser light scanned by the projection portion is incident on the part of the lens portion.

According to the present invention, as hereinabove described, the effect of sufficiently reducing speckle noise can be obtained by sufficiently diffusing the laser light.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 3 is a diagram showing a state where laser light is split by a part of the lens portion of the projector according to the first embodiment of the present invention;

FIG. 4 is a schematic view for illustrating the focal length of a microlens array of the projector according to the first embodiment of the present invention;

DESCRIPTION OF THE PREFERRED EMBODIMENTS

Embodiments of the present invention are hereinafter described with reference to the drawings.

(First Embodiment)

The structure of a projector 100 according to a first embodiment of the present invention is now described with reference to FIGS. 1 to 6.

Figure 1A:
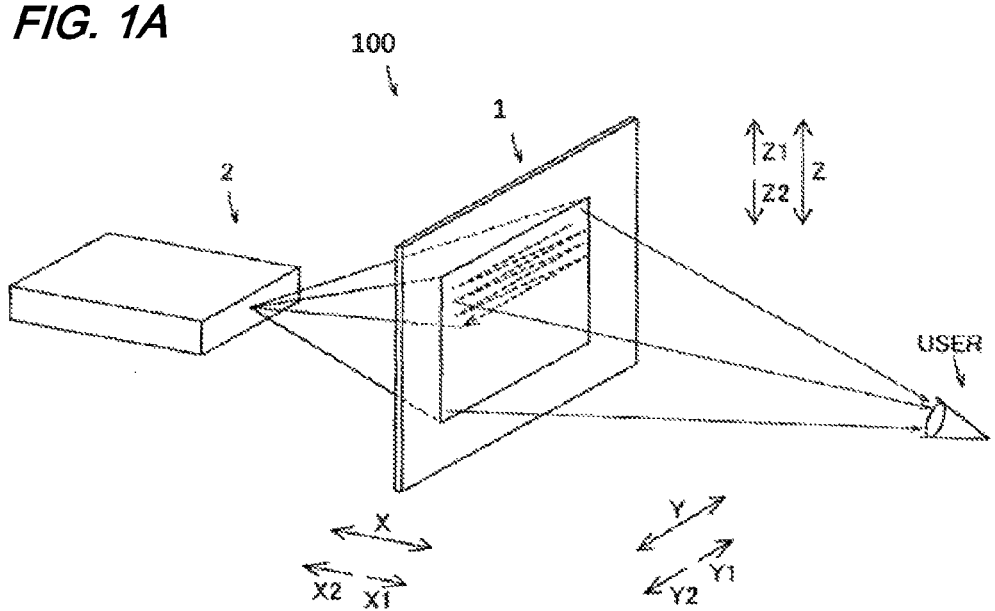
FIG. 1A is a schematic view showing a projector according to a first embodiment of the present invention.

The projector 100 according to the first embodiment of the present invention is mainly constituted by a transmissive screen 1 and a projector body 2, as shown in FIG. 1A. The projector 100 is configured such that a scanned laser light is projected on the transmissive screen 1 from the projector body 2. The projector body 2 scans the laser light so that the transmissive screen 1 can display a picture (image). The transmissive screen 1 is an example of the "projection screen" in the present invention.

Figure 2:
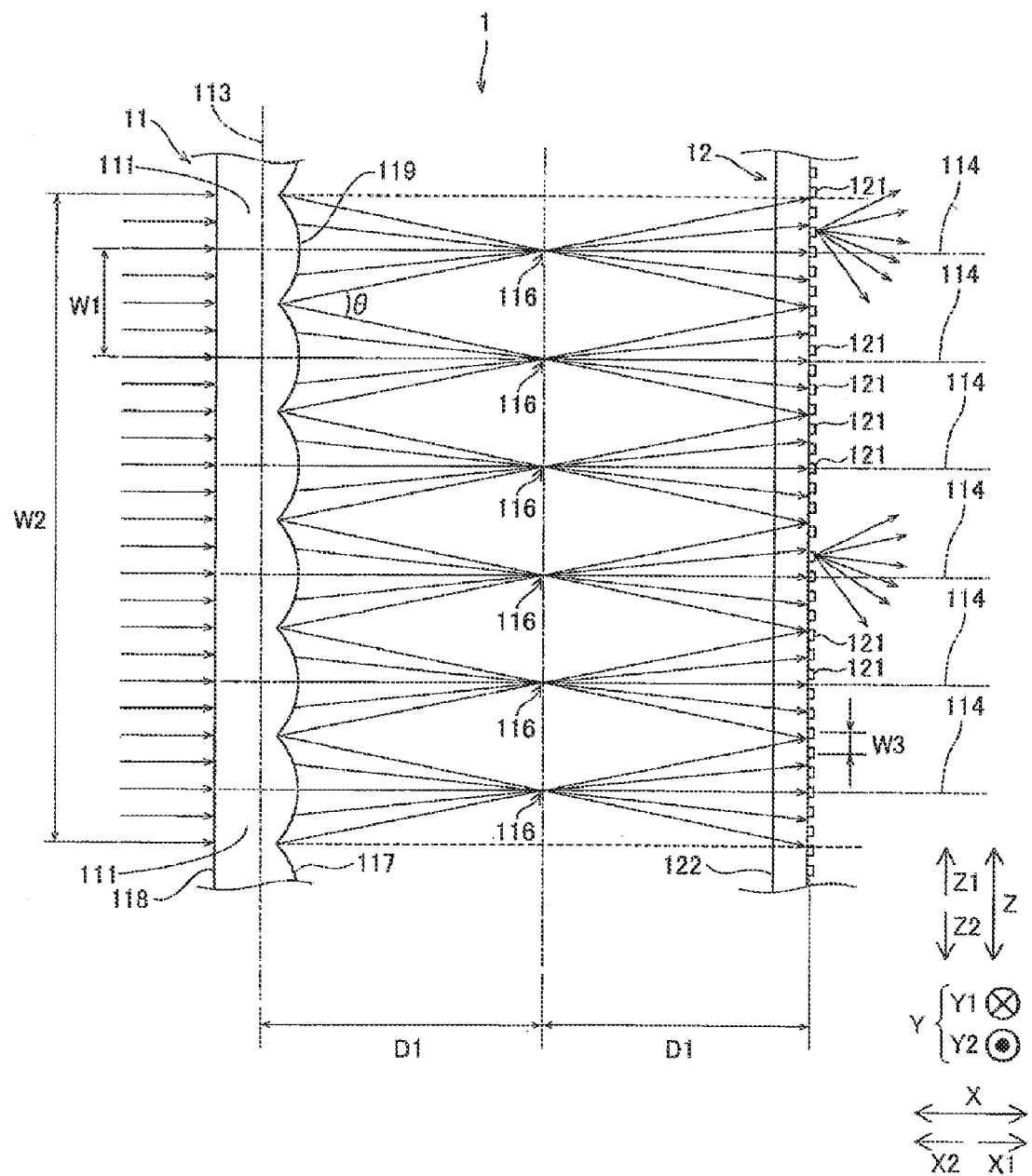
FIG. 2 is a diagram showing a state where laser light is split by a lens portion of the projector according to the first embodiment of the present invention.
Figure 5:
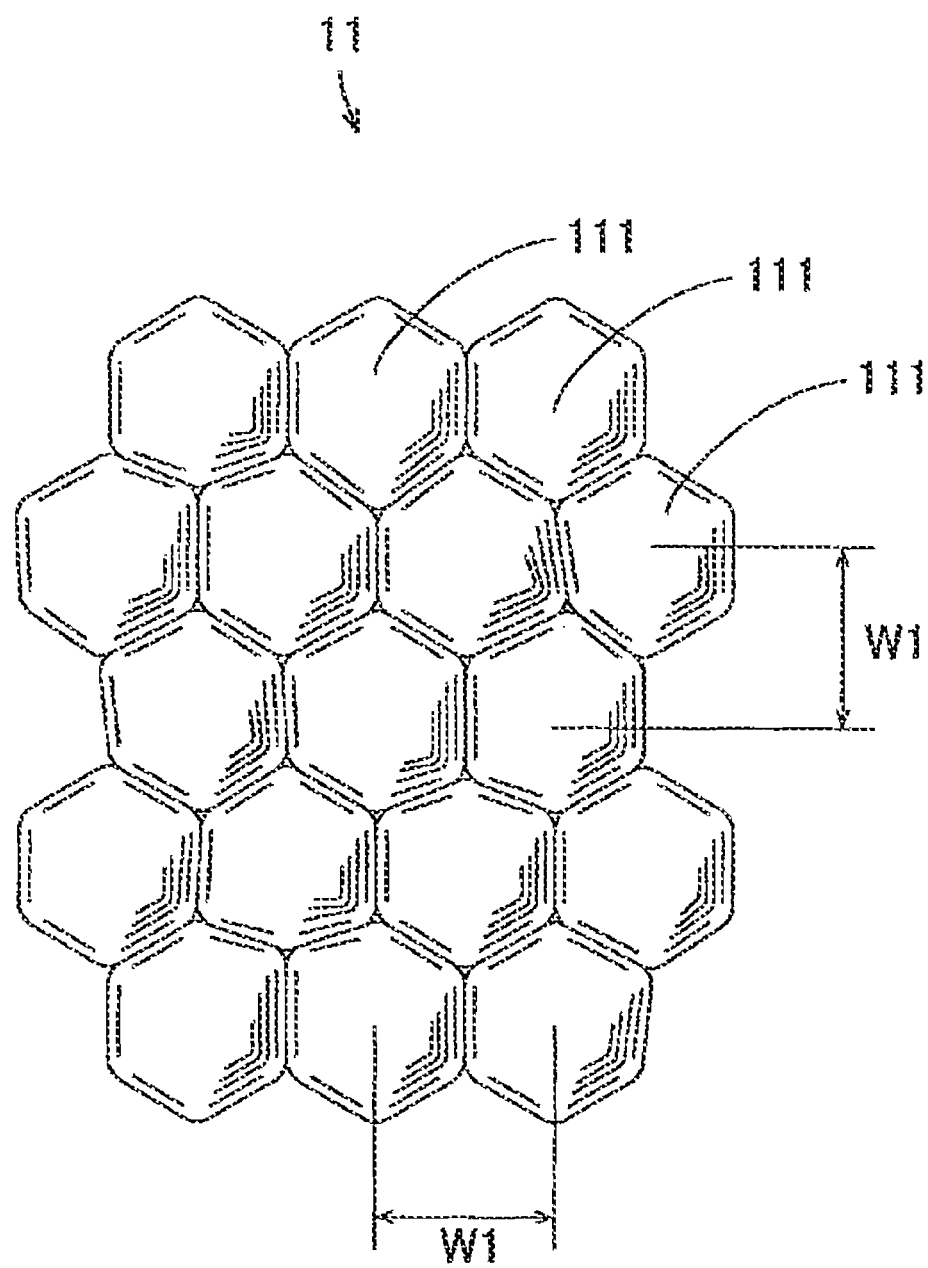
FIG. 5 is a plan view showing the microlens array of the projector according to the first embodiment of the present invention.

The transmissive screen 1 is mainly constituted by a microlens array 11 including a plurality of lens portions 111 and a directional diffusion sheet 12 having a plurality of diffusion portions 121 diffusing the laser light, as shown in FIGS. 2 and 3. The microlens array 11 and the directional diffusion sheet 12 are arranged at a prescribed interval through a spacer (not shown). The microlens array 11 is an example of the "lens member" in the present invention. The directional diffusion sheet 12 is an example of the "diffusion member" in the present invention.

The microlens array 11 (lens portions 111) has a prescribed focal length D1, as shown in FIG. 4. Specifically, laser light (incident light) incident from the X2 side of the microlens array 11 (lens portions 111) is refracted when the laser light is incident on the microlens array 11. Laser light (outgoing light) outgoing from the X1 side of the microlens array 11 (lens portions 111) is refracted by the lens portions 111. The locus of the intersection 112 of the extended lines of the incident light and outgoing light is defined as an optical principal surface 113. The intersection of the principal surface 113 and an optical axis 114 corresponding to the rotational symmetry axis of each of the lens portions 111 is defined as an optical principal point 115. A distance from the principal point 115 to a focal point 116 is defined as the focal length D1. The microlens array 11 has the prescribed focal length D1 (0.5 mm, for example). The microlens array 11 is made of glass, plastic, or the like.

According to the first embodiment, the microlens array 11 has a first (X1 side) surface 117 with a plurality of convex portions 119 and a substantially flat second (X2 side) surface 118, as shown in FIGS. 2 and 3. Each of the lens portions 111 is in the form of a convex lens due to the convex portions 119 of the surface 117 on the X1 side. In other words, the microlens array 11 includes convex lenses each having a projecting surface. The surface 118 of the microlens array 11 on the X2 side is configured such that the laser light outgoing from the projector body 2 is incident thereon. The microlens array 11 is configured such that a lens pitch between adjacent lens portions 111 is W1. The microlens array 11 is configured such that the plurality of irregular (the six sides of the hexagon are different in length) hexagonal lens portions 111 (see FIG. 5) are arranged. The microlens array 11 is configured such that the plurality of lens portions 111 are placed closely (the microlens array 11 is plane-filled with the plurality of lens portions 111) in a plan view. In this microlens array 11, the convex portions 119 of the plurality of lens portions 111 are formed such that the lens pitch between the adjacent lens portions 111 is W1.

According to the first embodiment, the microlens array 11 is configured such that the lens pitch W1 between the lens portions 111 is smaller than the diameter W2 of laser light emitted from a red LD 23, a blue LD 24, and a green LD 25 (see FIG. 6) described later, as shown in FIGS. 2 and 3. Specifically, the microlens array 11 is configured such that the lens pitch W1 between the lens portions 111 is not more than about one third (about one sixth) the diameter W2 of the laser light emitted from the red LD 23, the blue LD 24, and the green LD 25. For example, the lens pitch W1 between the lens portions 111 is about 0.1 mm, and the diameter W2 of the laser light emitted from the red LD 23, the blue LD 24, and the green LD 25 is about 0.6 mm.

According to the first embodiment, the plurality of lens portions 111 are configured to split the laser light scanned by a scanner mirror 28 (see FIG. 6), as shown in FIGS. 2 and 3. As shown in FIG. 2, when the laser light is incident on the entire convex portions 119 of the lens portions 111 (the laser light is projected on the directional diffusion sheet 12 such that the laser light is symmetrical to the focal point 116), the laser light is narrowed down while being evenly split into three pieces in a straight advancing direction. As shown in FIG. 3, the laser light is incident on a part of the convex portions 119 of the lens portions 111 (the laser light is projected on the directional diffusion sheet 12 such that the laser light is symmetrical to the focal point 116), the laser light is narrowed down while being unevenly split. In this case, a region on which no laser light is projected is generated in the directional diffusion sheet 12.

The directional diffusion sheet 12 is arranged on the display side (X1 side) beyond the microlens array 11, as shown in FIGS. 2 and 3. The directional diffusion sheet 12 has directivity of diffusing the incident laser light to the display side (an opposite side to an incident surface 122 described later). The directional diffusion sheet 12 further has directivity of not diffusing outside light (indoor illumination light, for example) incident from the X1 side to the display side. The directional diffusion sheet 12 is made of plastic or the like, for example.

According to the first embodiment, the directional diffusion sheet 12 is arranged to be opposed to the microlens array 11 and includes the flattened incident surface 122 on which the laser light split by the lens portions 111 is incident and the diffusion portions 121 diffusing the laser light incident from the incident surface 122, as shown in FIGS. 2 and 3. The plurality of diffusion portions 121 are provided in the vicinity of the surface of the directional diffusion sheet 12 on the display side (X1 side). As shown in FIGS. 2 and 3, in this embodiment, no diffusion portions are provided in the vicinity of the surface of the directional diffusion sheet 12 on the microlens array side (X2 side). The diffusion portions 121 are constituted by beads, holes, refractive index interfaces, etc., for example. The diffusion portions 121 can be arranged at arbitrary positions of the directional diffusion sheet 12. The pitch W3 (50 μm, for example) between the plurality of diffusion portions 121 in a direction Z is sufficiently smaller than the lens pitch W1 between the lens portions 111. The transmissive screen 1 is configured such that the substantially flattened surface 118 of the microlens array 11 is substantially parallel to the incident surface 122 of the directional diffusion sheet 12.

According to the first embodiment, the diffusion portions 121 of the directional diffusion sheet 12 are arranged at positions apart by a distance larger than the focal length D1 of the lens portions 111 along the optical axis 114 with respect to the optical principal surface 113 of the microlens array 11 and apart by a distance not larger than about twice the focal length D1 of the microlens array 11, as shown in FIGS. 2 and 3. Specifically, the diffusion portions 121 of the directional diffusion sheet 12 are arranged at positions apart by a distance (1 mm, for example) about twice the focal length D1 of the microlens array 11 along the optical axis 114 with respect to the optical principal surface 113 of the microlens array 11.

As shown in FIGS. 2 and 3, at the positions apart by the distance larger than the focal length D1 along the optical axis 114 with respect to the optical principal surface 113 of the microlens array 11, the pitch W3 between the diffusion portions 121 is relatively widened with respect to the diameter W2 of the laser light. The transmissive screen 1 is configured such that the laser light split by the microlens array 11 is diffused by the diffusion portions 121 of the directional diffusion sheet 12. The inventors have confirmed that as an angle θ at which the laser light (each component of the laser light) split by the microlens array 11 intersects increases (the laser light is significantly narrowed down by the microlens array 11), speckle noise is more effectively reduced.

Figure 6:
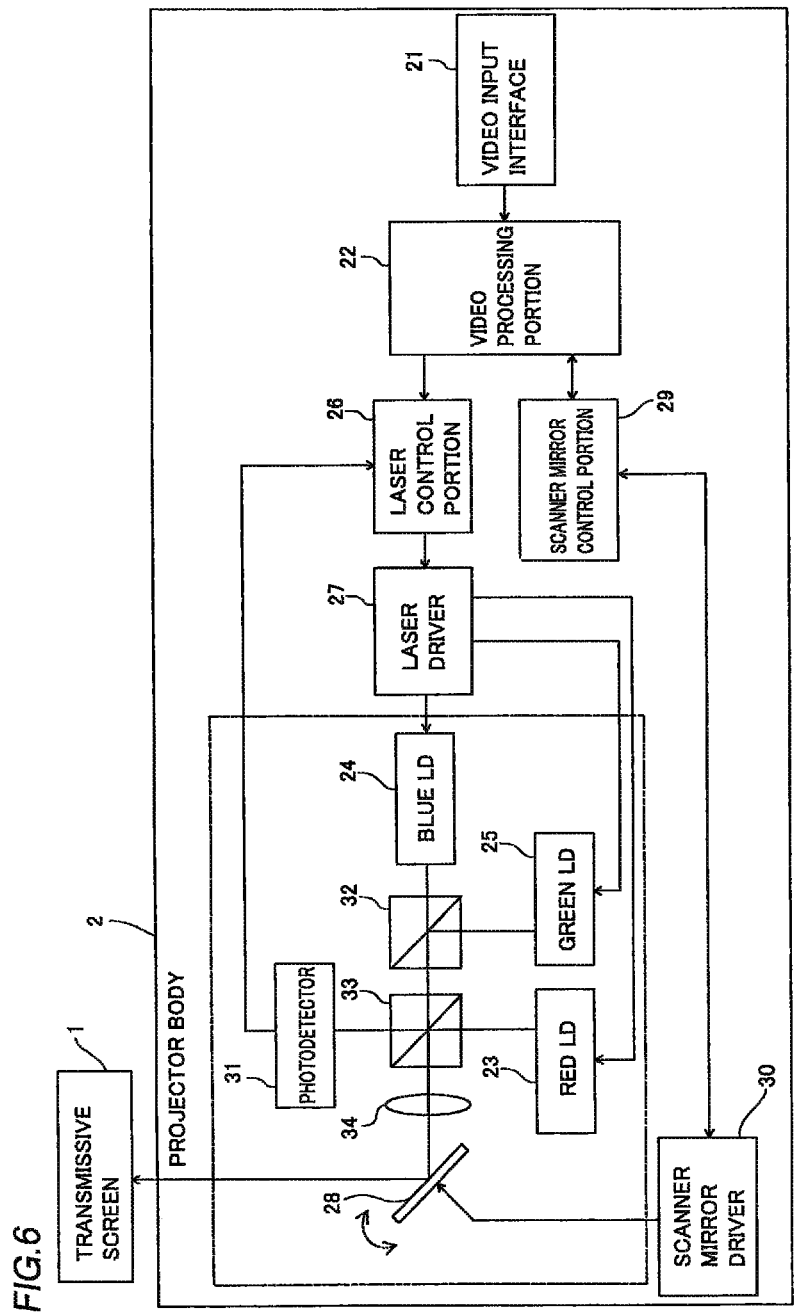
FIG. 6 is a block diagram showing a projector body of the projector according to the first embodiment of the present invention.

The structure of the projector body 2 is now described with reference to FIG. 6. The projector body 2 is configured to project an input picture on the transmissive screen 1 through a video input interface 21. The projector body 2 includes a video processing portion 22, the red laser diode (red LD) 23 capable of outputting red laser light, the blue laser diode (blue LD) 24 capable of outputting blue laser light, the green laser diode (green LD) 25 capable of outputting green laser light, a laser control portion 26, and a laser driver 27. The red LD 23, the blue LD 24, and the green LD 25 are configured to emit the laser light on the basis of an input image signal. The projector body 2 further includes the single scanner mirror 28, a scanner mirror control portion 29, a scanner mirror driver 30 driving the scanner mirror 28, and a photodetector 31 detecting the gradation of the RGB (red, green, and blue) laser light. In addition to the red LD 23, the blue LD 24, the green LD 25, the scanner mirror 28, and the photodetector 31, two half mirrors 32 and 33 and a lens 34 are provided as the optical system of the projector body 2. The red LD 23, the blue LD 24, and the green LD 25 are examples of the "laser light generation portion" in the present invention.

The video processing portion 22 is configured to transmit video signal data to the laser control portion 26 at a prescribed time interval on the basis of an input picture signal. Thus, the laser control portion 26 can recognize pixel (image forming element) information at a prescribed scanning position.

The scanner mirror 28 is driven by the scanner mirror driver 30 and is a small-sized vibrating mirror element capable of vibrating at a prescribed deflection angle. The scanner mirror 28 is configured to project an image by scanning the laser light emitted from the red LD 23, the blue LD 24, and the green LD 25. The scanner mirror control portion 29 is configured to control the scanner mirror driver 30 on the basis of the pixel information at the prescribed scanning position recognized by the video processing portion 22. In other words, the scanner mirror 28 is vibrated to scan the RGB laser light in a zigzag manner (to reciprocate in a direction Y while displacing the height position in the direction Z (see FIG. 1A)) over an entire projection range on the basis of control performed by the scanner mirror control portion 29. The scanner mirror 28 is an example of the "projection portion" in the present invention.

The photodetector 31 is arranged to be capable of detecting the laser light from the red LD 23, the blue LD 24, and the green LD 25. The photodetector 31 is connected to the laser control portion 26 and is configured to output the detected gradation of the laser light to the laser control portion 26. The laser control portion 26 is configured to determine whether or not the gradation is correct as compared with the pixel information at the scanning position on the basis of the gradation input from the photodetector 31 and adjust the outputs (luminance) of the red LD 23, the blue LD 24, and the green LD 25 to obtain the correct gradation when the gradation is not correct.

The structure of the optical system of the projector body 2 is now described. As shown in FIG. 6, the half mirror 32 is arranged at a position where the blue laser light and the green laser light intersect each other at right angles. This half mirror 32 is configured to transmit the blue laser light and reflect the green laser light. The half mirror 33 is arranged at a position where the blue and green laser light passing through the half mirror 32 and the red laser light intersect each other at right angles. The half mirror 33 is configured to partially reflect the blue and green laser light toward the photodetector 31 and transmit the remaining blue and green laser light to the lens 34. Furthermore, the half mirror 33 is configured to partially transmit the red laser light to the photodetector 31 and reflect the remaining red laser light toward the lens 34. The lens 34 has a function of aligning the optical axes of the red, blue, and green laser light to obtain the RGB laser light having prescribed gradation. The RGB laser light whose optical axis is aligned by the lens 34 is reflected by the scanner mirror 28 to be scanned toward the projection range.

According to the first embodiment, as hereinabove described, the diffusion portions 121 of the directional diffusion sheet 12 are arranged at the positions apart by the distance larger than the focal length D1 of the microlens array 11 along the optical axis 114 with respect to the optical principal surface 113 of the microlens array 11, whereby the laser light whose diameter is increased after passing through the focal position can be diffused by the diffusion portions 121, and hence a relative increase in the pitch between the diffusion portions 121 with respect to the spot diameter of the laser light at the diffusion portions 121 can be suppressed. Thus, the laser light can be sufficiently diffused by the diffusion portions 121, and hence the effect of sufficiently reducing speckle noise can be obtained by synthesizing the diffusion components.

According to the first embodiment, as hereinabove described, the diffusion portions 121 are arranged at the positions apart by the distance about twice the focal length D1 of the microlens array 11 along the optical axis 114 with respect to the optical principal surface 113 of the microlens array 11. Thus, the laser light whose diameter is increased to a diameter substantially equal to the diameter of the pre-split laser light can be diffused by the diffusion portions 121 while the split laser light is prevented from overlapping adjacent laser light by increasing the diameter after passing through the focal position. Consequently, the effect of sufficiently reducing speckle noise can be obtained while a reduction in the resolution of an image resulting from overlapping of the laser light is suppressed.

According to the first embodiment, as hereinabove described, the microlens array 11 is configured such that the lens pitch W1 between the lens portions 111 of the microlens array 11 is about one sixth the diameter of the laser light emitted from the red LD 23, the blue LD 24, and the green LD 25. Thus, the laser light scanned by the scanner mirror 28 can be easily split into small pieces, and the split laser light can be projected. Consequently, a reduction in the resolution of an image resulting from generation of a region on which no laser light is projected between a region on which the laser light split by a part of a lens portion 111 is projected and a region on which the laser light split by an adjacent lens portion 111 is projected can be suppressed when the laser light scanned by the scanner mirror 28 is incident on the part of the lens portion 111.

According to the first embodiment, as hereinabove described, the microlens array 11 is configured such that the first surface 117 thereof includes the lens portions 111 that are the projecting convex lenses and the second surface 118 thereof has the flat surface that is substantially flattened, the directional diffusion sheet 12 is configured such that the incident surface 122 thereof is substantially flattened, and the transmissive screen 1 is configured such that the surface 118 of the microlens array 11 is substantially parallel to the incident surface 122 of the directional diffusion sheet 12. Thus, the laser light whose diameter is uniformly increased (diameter is uniform in size) after passing through the focal position can be emitted and diffused to the entire diffusion portions 121, and hence a relative increase in the pitch between the diffusion portions 121 with respect to the spot diameter of the laser light at the diffusion portions 121 can be further suppressed.

According to the first embodiment, as hereinabove described, the lens member includes the microlens array 11 including the plurality of lens portions 111. Thus, the laser light scanned by the scanner mirror 28 can be easily split by the microlens array 11.

According to the first embodiment, as hereinabove described, the diffusion member includes the directional diffusion sheet 12 having directivity of diffusing the laser light in a prescribed direction. Thus, the laser light can be diffused to the display side, and hence a reduction in the luminance of an image resulting from excessive diffusion can be suppressed.

According to the first embodiment, as hereinabove described, the directional diffusion sheet 12 has directivity of diffusing the laser light toward an emitting surface opposite to the incident surface 122 and not diffusing the outside light incident from the emitting surface side toward the emitting surface. Thus, the laser light can be diffused toward the emitting surface, and hence a reduction in the luminance of an image resulting from excessive diffusion can be suppressed. Furthermore, the outside light is not diffused toward the emitting surface, and hence difficulty in viewing an image due to the outside light can be suppressed.

According to the first embodiment, as hereinabove described, the pitch W3 between the plurality of diffusion portions 121 is smaller than the lens pitch W1 of the microlens array 11. According to this structure, a coarse image due to the lens pitch W1 of the microlens array 11 can be suppressed.

According to the first embodiment, as hereinabove described, the diffusion portions 121 are provided on a side closer to the emitting surface opposite to the incident surface 122 with respect to the center of the directional diffusion sheet 12 in a thickness direction. Thus, the laser light diffused by the diffusion portions 121 can be suppressed from being refracted by the directional diffusion sheet 12 when travelling inside the directional diffusion sheet 12, and hence a reduction in the resolution of an image can be suppressed.

Second Embodiment

Figure 1B:
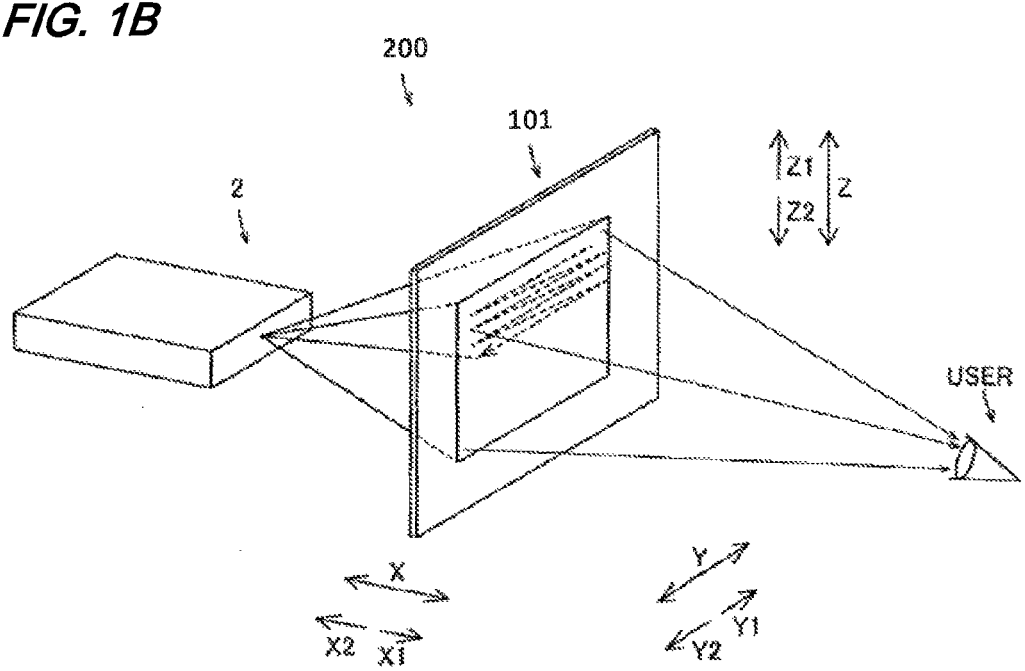
FIG. 1B is a schematic view showing a projector according to a second embodiment of the present invention.

The projector 200 according to the second embodiment of the present invention is mainly constituted by a transmissive screen 101 and a projector body 2, as shown in FIG. 1B. The structure of a projector 200 according to a second embodiment of the present invention is now described with reference to FIG. 7.

In this second embodiment, the projector 200 includes a transmissive screen 101 configured such that a microlens array 41 and a directional diffusion sheet 42 are directly bonded to each other, unlike in the first embodiment in which the microlens array 11 and the directional diffusion sheet 12 are arranged at the prescribed interval through the spacer. The microlens array 41 is an example of the "lens member" in the present invention. The directional diffusion sheet 42 is an example of the "diffusion member" in the present invention. The transmissive screen 101 is an example of the "projection screen" in the present invention.

The projector 200 according to the second embodiment includes a red LD 23, a blue LD 24, and a green LD 25 each emitting laser light on the basis of an input image signal, a scanner mirror 28 projecting an image by scanning the laser light emitted from the red LD 23, the blue LD 24, and the green LD 25, and the transmissive screen 1-1 on which the image is projected.

Figure 7:
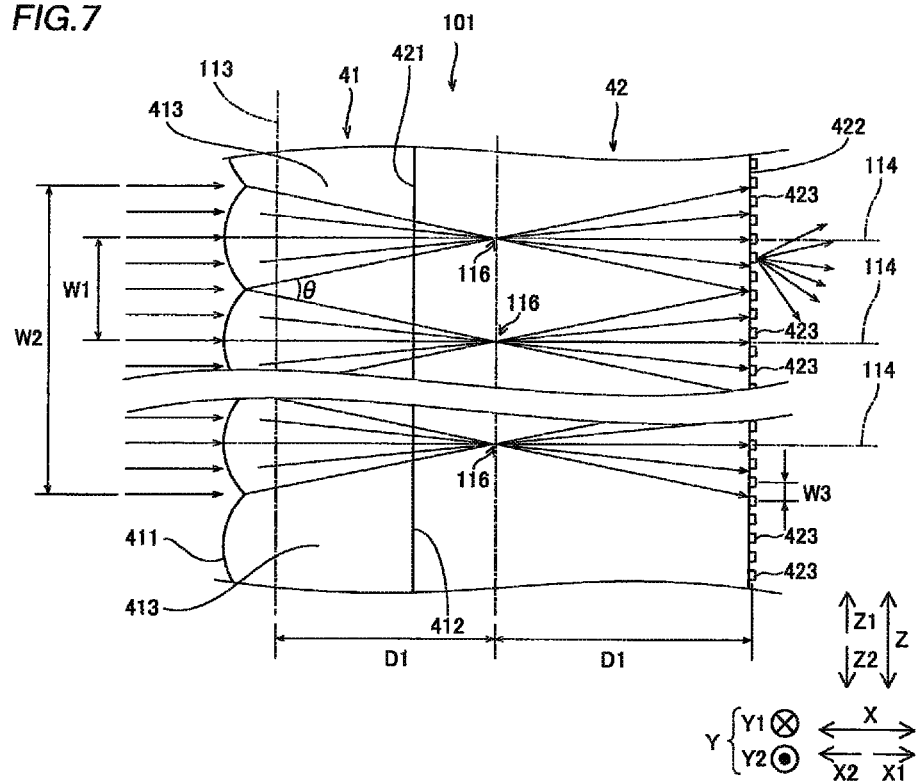
FIG. 7 is a side elevational view showing a transmissive screen of a projector according to a second embodiment of the present invention.

The transmissive screen 101 includes the microlens array 41 including a plurality of lens portions 413 splitting the laser light scanned by the scanner mirror 28 and the directional diffusion sheet 42 arranged to be opposed to the microlens array 41, having an incident surface 421 on which the laser light split by the microlens array 41 is incident and a plurality of diffusion portions 423 diffusing the laser light incident from the incident surface 421, as shown in FIG. 7. The microlens array 41 is configured such that a first (X2 side) surface 411 thereof projects in the form of convex lenses and a second (X1 side) surface thereof has a flat surface 412 that is substantially flattened. In other words, the microlens array 41 includes convex lenses each having a projecting surface. The microlens array 41 has a prescribed focal length D1. The microlens array 41 is configured such that a lens pitch between adjacent lens portions 413 is W1.

The directional diffusion sheet 42 is formed such that the incident surface 421 (the surface on the X1 side) is substantially flat, as shown in FIG. 7. The diffusion portions 423 are formed in the vicinity of an emitting surface 422 opposite (X1 side) to the incident surface 421 of the directional diffusion sheet 42. As shown in FIG. 7, in this embodiment, no diffusion portions are provided in the vicinity of the incident surface 421 (X2 side) of the directional diffusion sheet 42. The transmissive screen 101 is configured such that the flat surface 412 of the microlens array 41 and the incident surface 421 of the directional diffusion sheet 42 are bonded to each other. The microlens array 41 and the directional diffusion sheet 42 are bonded to each other with an ultraviolet adhesive or the like, for example.

The plurality of diffusion portions 423 are arranged at positions apart by a distance larger than the focal length D1 of the microlens array 41 along an optical axis 114 with respect to the optical principal surface 113 of the microlens array 41, as shown in FIG. 7. The incident surface 421 of the directional diffusion sheet 42 is arranged on a position closer to the microlens array 41 than a position apart by the focal length D1 of the microlens array 41 along the optical axis 114 with respect to the optical principal surface 113 of the microlens array 41. The plurality of diffusion portions 423 are configured such that a pitch between adjacent diffusion portions 423 is W3.

The remaining structure of the projector 200 according to the second embodiment is similar to that of the projector 100 according to the aforementioned first embodiment.

According to the second embodiment, as hereinabove described, the diffusion portions 423 of the directional diffusion sheet 42 are arranged at the positions apart by the distance larger than the focal length D1 of the microlens array along the optical axis 114 with respect to the optical principal surface 113 of the microlens array 41, whereby the laser light whose diameter is increased after passing through the focal position can be diffused by the diffusion portions 423, and hence a relative increase in the pitch between the diffusion portions 423 with respect to the spot diameter of the laser light at the diffusion portions 423 can be suppressed. Thus, the laser light can be sufficiently diffused by the diffusion portions 423, and hence the effect of sufficiently reducing speckle noise can be obtained by synthesizing the diffusion components.

According to the second embodiment, as hereinabove described, the microlens array 41 is formed to have the flat surface 412, the directional diffusion sheet 42 is configured such that the incident surface 421 is substantially flat and the diffusion portions 423 are formed in the vicinity of the emitting surface 422, and the flat surface 412 of the microlens array 41 and the incident surface 421 of the directional diffusion sheet 42 are bonded to each other. Thus, the diffusion portions 423 can be stably arranged at positions apart by a prescribed distance larger than the focal length D1 of the microlens array 41 along the optical axis 114 with respect to the optical principal surface 113 of the microlens array 41.

The remaining effects of the second embodiment are similar to those of the aforementioned first embodiment.

The embodiments disclosed this time must be considered as illustrative in all points and not restrictive. The range of the present invention is shown not by the above description of the embodiments but by the scope of claims for patent, and all modifications within the meaning and range equivalent to the scope of claims for patent are further included.

Figure 8:
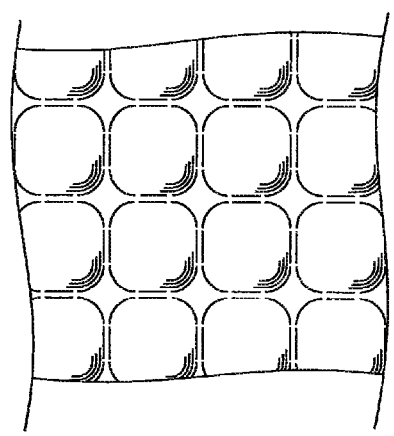
FIG. 8 is a plan view showing a microlens array including substantially square lens portions of a projector according to a modification of the first embodiment of the present invention.
Figure 9:
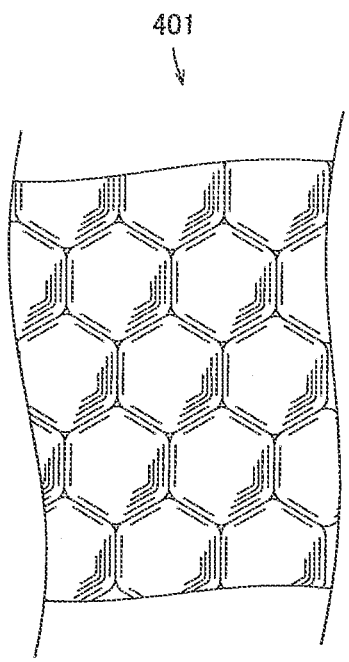
FIG. 9 is a plan view showing a microlens array including substantially regular hexagonal lens portions of a projector according to another modification of the first embodiment of the present invention.
Figure 10:
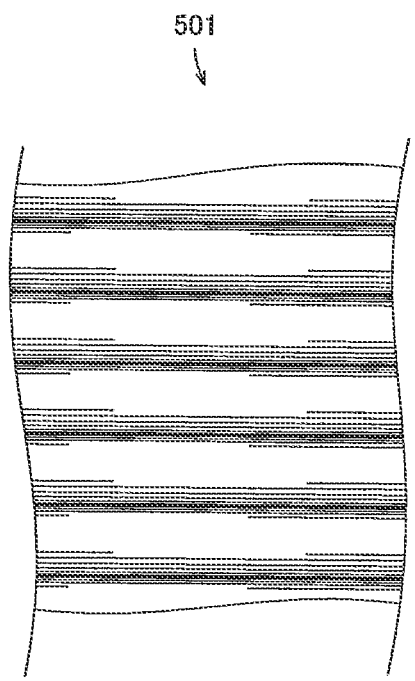
FIG. 10 is a plan view showing a microlens array including lenticular-shaped lens portions of a projector according to another modification of the first embodiment of the present invention.
Figure 11:
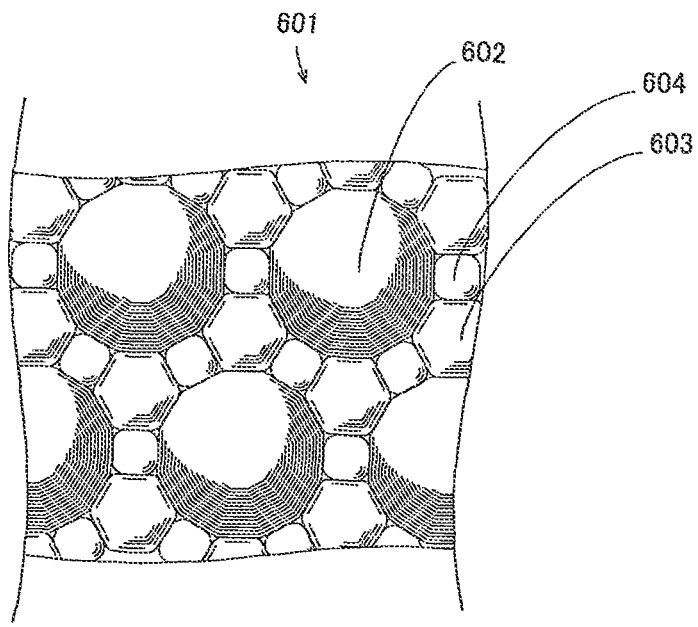
FIG. 11 is a plan view showing a microlens array including lens portions different in size of a projector according to another modification of the first embodiment of the present invention.

For example, while the microlens array (lens member) is configured such that the irregular (the six sides of the hexagon are different in length) hexagonal lens portions are placed closely (the microlens array is plane-filled with the irregular hexagonal lens portions) in the plan view in each of the aforementioned first and second embodiments, the present invention is not restricted to this. According to the present invention, the lens member may alternatively be configured such that irregular polygonal lens portions other than the irregular hexagonal lens portions are placed closely in the plan view. Furthermore, according to the present invention, the lens member may alternatively be configured such that regular polygonal (substantially square (the four sides of the tetragon are substantially equal in length) in the plan view (see FIG. 8), substantially regular hexagonal (the six sides of the hexagon are substantially equal in length) in the plan view (see FIG. 9), or the like, for example) lens portions other than the irregular hexagonal lens portions are placed closely in the plan view. In addition, according to the present invention, the lens member may alternatively be configured such that lenticular-shaped lens portions are placed closely in the plan view, as shown in FIG. 10. Moreover, according to the present invention, the lens member may alternatively be configured such that a plurality of lens portions different in size are placed closely in the plan view, as shown in FIG. 11.

While the diffusion portions are arranged at the positions apart by the distance about twice the focal length D1 of the microlens array (lens member) along the optical axis with respect to the optical principal surface of the microlens array in each of the aforementioned first and second embodiments, the present invention is not restricted to this. According to the present invention, the diffusion portions may alternatively be arranged at positions apart by a distance smaller (closer) than the distance about twice the focal length of the lens member along the optical axis with respect to the optical principal surface of the lens member, so far as the diffusion portions are arranged at the positions apart by the distance larger than the focal length of the lens member along the optical axis with respect to the optical principal surface of the lens member.

While the lens pitch of the microlens array (lens member) is about one sixth the diameter of the laser light in each of the aforementioned first and second embodiments, the present invention is not restricted to this. According to the present invention, the lens pitch of the lens member may alternatively be less than about one third and at least about one tenth the diameter of the laser light. The lens pitch of the lens member is preferably less than about one sixth and at least about one tenth the diameter of the laser light. According to this structure, a reduction in the resolution of the image projected on the projection screen resulting from generation of the region on which no laser light is projected between the region on which the laser light split by the part of the lens portion is projected and the region on which the laser light split by the adjacent lens portion is projected can be suppressed when the laser light scanned by the projection portion is incident on the part of the lens portion, while a coarse (rough) image projected on the projection screen due to the lens pitch of the lens member is suppressed.

Figure 12:
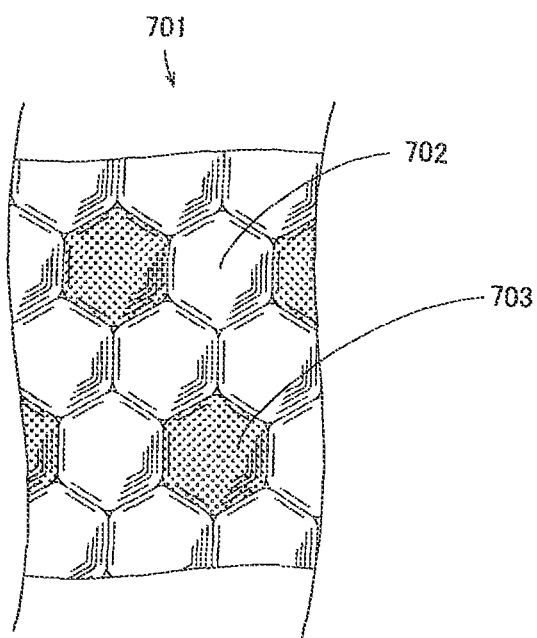
FIG. 12 is a plan view showing a microlens array including lens portions having different focal lengths of a projector according to another modification of the first embodiment of the present invention.

While the microlens array (lens member) is configured such that the lens portions having constant focal lengths are arranged in each of the aforementioned first and second embodiments, the present invention is not restricted to this. According to the present invention, the lens member may alternatively be configured such that lens portions 702 and 703 having at least two different focal lengths are arranged, as shown in FIG. 12.

While the microlens array (lens member) is configured such that the lens portions between which the lens pitch is constant are arranged in each of the aforementioned first and second embodiments, the present invention is not restricted to this. According to the present invention, the lens member may alternatively be configured such that lens portions having at least two different lens pitches are arranged. For example, the lens member may alternatively be configured such that lens portions 602, 603, and 604 having three different lens pitches are arranged, as shown in FIG. 11.

While the directional diffusion sheet is shown as the example of the diffusion member in each of the aforementioned first and second embodiments, the present invention is not restricted to this. According to the present invention, a diffusion member such as a volume diffuser of a translucent white plate or the like or a surface diffuser of ground glass or the like other than the directional diffusion sheet may alternatively be employed, for example.

Figure 13:
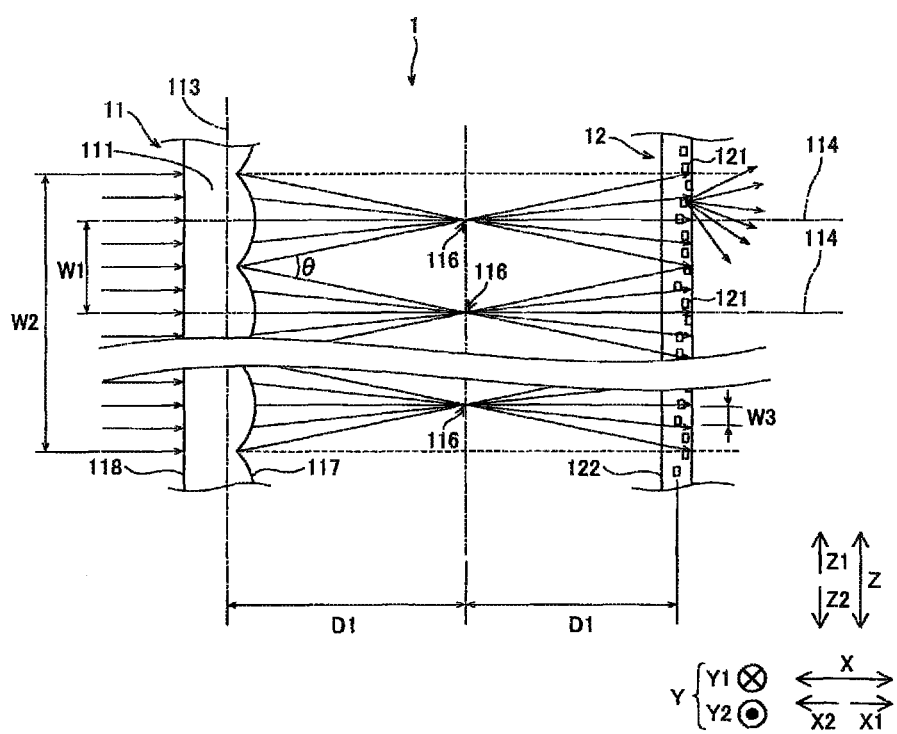
FIG. 13 is a diagram showing a directional diffusion sheet of a projector according to another modification of the first embodiment of the present invention.

While the diffusion portions are provided in the vicinity of the surface of the directional diffusion sheet (diffusion member) on the X1 side in each of the aforementioned first and second embodiments, the present invention is not restricted to this. According to the present invention, the diffusion portions may alternatively be provided at arbitrary positions of the internal portion of the diffusion member, so far as a diffusion portion arranged at a position closest to the lens member is provided at the position apart by the distance larger than the focal length of the lens member along the optical axis with respect to the optical principal surface of the lens member, as shown in FIG. 13.

While the microlens array (lens member) having the first surface projecting in the form of convex lenses is shown in each of the aforementioned first and second embodiments, the present invention is not restricted to this. According to the present invention, a lens member having both surfaces projecting in the form of convex lenses may alternatively be employed.

While the microlens array is shown as the example of the lens member in each of the aforementioned first and second embodiments, the present invention is not restricted to this.

The present invention is not restricted to the microlens array formed of the plurality of lens portions, but a lens member other than the microlens array may alternatively be employed, so far as the same has a function of splitting the laser light.

While the transmissive screen is shown as the example of the projection screen in each of the aforementioned first and second embodiments, the present invention is not restricted to this. According to the present invention, a projection screen other than the transmissive screen, such as a reflective screen, may be employed, for example.

What is claimed is:

1. A projector comprising:
a laser light generation portion emitting laser light on the basis of an input image signal;
a projection portion projecting an image by scanning the laser light emitted from the laser light generation portion; and
a projection screen on which the image is projected, wherein
the projection screen includes a lens member including a plurality of lens portions splitting the laser light scanned by the projection portion and a diffusion member arranged to be opposed to the lens member, having an incident surface on which the laser light split by the lens member is incident and a diffusion portion diffusing the laser light incident from the incident surface, wherein
the diffusion portion of the diffusion member is arranged at a position apart by a distance larger than a focal length of the lens member along an optical axis with respect to an optical principal surface of the lens member, and
the diffusion portion is provided on a side closer to an emitting surface with respect to a center of the diffusion member in a thickness direction and no diffusion portion is provided on a side closer to the incident surface opposite to the emitting surface with respect to the center of the diffusion member in the thickness direction.

2. The projector according to claim 1, wherein
the diffusion portion of the diffusion member is arranged at a position apart by a distance larger than the focal length of the lens member along the optical axis with respect to the optical principal surface of the lens member and apart by a distance not larger than about twice the focal length of the lens member.

3. The projector according to claim 2, wherein
the diffusion portion of the diffusion member is arranged at a position apart by a distance larger than the focal length of the lens member along the optical axis with respect to the optical principal surface of the lens member and apart by a distance about twice the focal length of the lens member.

4. The projector according to claim 1, wherein
the optical principal surface is a locus of an intersection of an extended line of incident light incident on the lens member and an extended line of outgoing light outgoing from the lens member.

5. The projector according to claim 1, wherein
a lens pitch between the lens portions of the lens member is smaller than a diameter of the laser light emitted from the laser light generation portion.

6. The projector according to claim 5, wherein
the lens pitch between the lens portions of the lens member is not more than about one third the diameter of the laser light emitted from the laser light generation portion.

7. The projector according to claim 1, wherein
the lens member is configured such that a first surface thereof includes a projecting convex lens and a second surface thereof has a flat surface that is substantially flattened,
the diffusion member is configured such that the incident surface thereof is substantially flattened, and
the projection screen is configured such that the flat surface of the lens member is substantially parallel to the incident surface of the diffusion member.

8. The projector according to claim 1, wherein
the lens member is configured such that the lens portions having at least two different focal lengths are arranged.

9. The projector according to claim 1, wherein
the lens member is configured such that the lens portions are arranged at at least two different lens pitches.

10. The projector according to claim 1, wherein
the lens member comprises a microlens array including the plurality of lens portions.

11. The projector according to claim 1, wherein
the diffusion member comprises a directional diffusion sheet having directivity of diffusing the laser light in a prescribed direction.

12. The projector according to claim 11, wherein
the directional diffusion sheet has directivity of diffusing the laser light toward an emitting surface opposite to the incident surface and not diffusing outside light incident from an emitting surface side toward the emitting surface.

13. The projector according to claim 1, wherein
the lens member is configured such that a first surface thereof projects in the form of a convex lens and a second surface thereof has a flat surface that is substantially flattened,
the diffusion member is configured such that the incident surface is substantially flattened and the diffusion portion is formed in a vicinity of the emitting surface opposite to the incident surface, and
the projection screen is configured such that the flat surface of the lens member and the incident surface of the diffusion member are bonded to each other.

14. The projector according to claim 1, wherein
a plurality of diffusion portions are provided, and a pitch between the plurality of diffusion portions is smaller than a lens pitch of the lens member.

15. A projection screen comprising:
a lens member including a plurality of lens portions splitting emitted laser light; and
a diffusion member arranged to be opposed to the lens member, having an incident surface on which the laser light split by the lens member is incident and a diffusion portion diffusing the laser light incident from the incident surface, wherein
the diffusion portion of the diffusion member is arranged at a position apart by a distance larger than a focal length of the lens member along an optical axis with respect to an optical principal surface of the lens member, and
the diffusion portion and is provided on a side closer to an emitting surface with respect to a center of the diffusion member in a thickness direction and no diffusion portion is provided on a side closer to the incident surface opposite to the emitting surface with respect to the center of the diffusion member in the thickness direction.

16. The projection screen according to claim 15, wherein
the diffusion portion of the diffusion member is arranged at a position apart by a distance larger than the focal length of the lens member along the optical axis with respect to the optical principal surface of the lens member and apart by a distance not larger than about twice the focal length of the lens member.

17. The projection screen according to claim 15, wherein the optical principal surface is a locus of an intersection of an extended line of incident light incident on the lens member and an extended line of outgoing light outgoing from the lens member.

18. The projection screen according to claim 15, wherein a lens pitch between the lens portions of the lens member is smaller than a diameter of the emitted laser light.

19. The projection screen according to claim 18, wherein the lens pitch between the lens portions of the lens member is not more than about one third the diameter of the emitted laser light.

* * * * *